(12) United States Patent
Strömmen et al.

(10) Patent No.: US 11,091,996 B2
(45) Date of Patent: Aug. 17, 2021

(54) METHOD AND SYSTEM FOR SEPARATING OIL WELL SUBSTANCES

(71) Applicant: Seabed Separation AS, Trondheim (NO)

(72) Inventors: Roe Dag Strömmen, Trondheim (NO); Asle Jostein Hovda, Jakobsli (NO); Jon Sigurd Berntsen, Porsgrunn (NO)

(73) Assignee: Seabed Separation AS, Trondheim (NO)

( * ) Notice: Subject to any disclaimer, the term of this patent is extended or adjusted under 35 U.S.C. 154(b) by 0 days.

(21) Appl. No.: 16/334,846

(22) PCT Filed: Sep. 29, 2017

(86) PCT No.: PCT/NO2017/050253
§ 371 (c)(1),
(2) Date: Mar. 20, 2019

(87) PCT Pub. No.: WO2018/063007
PCT Pub. Date: Apr. 5, 2018

(65) Prior Publication Data
US 2020/0018146 A1 Jan. 16, 2020

(30) Foreign Application Priority Data
Sep. 30, 2016 (NO) .................................. 20161578

(51) Int. Cl.
*E21B 43/36* (2006.01)
*B01D 17/02* (2006.01)
(Continued)

(52) U.S. Cl.
CPC .......... *E21B 43/36* (2013.01); *B01D 17/0214* (2013.01); *B01D 17/045* (2013.01);
(Continued)

(58) Field of Classification Search
CPC ... E21B 43/36; B01D 17/0214; B01D 17/045; B01D 19/0057
See application file for complete search history.

(56) References Cited

U.S. PATENT DOCUMENTS 4,760,742 A * 8/1988 Hatton ...................... F17D 3/00
73/861.04
7,611,635 B2 * 11/2009 Chieng ................... E21B 43/34
210/744

(Continued)

FOREIGN PATENT DOCUMENTS

EP 2934714 B1 * 7/2017 ......... B01D 17/0214
EP 2934714 B1 7/2017
(Continued)

OTHER PUBLICATIONS

International Search Report and Written Opinion dated Jan. 23, 2018 for International Patent Application No. PCT/NO2017/050253.

*Primary Examiner* — Matthew R Buck
(74) *Attorney, Agent, or Firm* — Alix, Yale & Ristas, LLP

(57) ABSTRACT

A method and system for separating oil well substances by using a separator system comprising inclined tubular oil and water separators for separating the respective fluid components mixed in fluids from oil wells, combined with providing a liquid lock upstream the inclined tubular oil and water separators, as well as establishing and maintaining water-wetted entrance to the inclined tubular oil and water separators.

12 Claims, 5 Drawing Sheets

(51) Int. Cl.
*B01D 17/04* (2006.01)
*B01D 19/00* (2006.01)
*B01D 21/24* (2006.01)

(52) U.S. Cl.
CPC ...... *B01D 19/0057* (2013.01); *B01D 19/0068* (2013.01); *B01D 21/2422* (2013.01)

(56) References Cited

U.S. PATENT DOCUMENTS

| | | | | |
|---|---|---|---|---|
| 7,901,492 B2* | 3/2011 | Gramme | ................ | E21B 43/34 |
| | | | | 96/182 |
| 8,308,959 B2* | 11/2012 | Noles, Jr. | ........... | B01D 21/0045 |
| | | | | 210/519 |
| 8,894,755 B2* | 11/2014 | Bruun | ................ | B01D 19/0063 |
| | | | | 96/157 |
| 9,314,715 B2* | 4/2016 | Grave | .................... | B01D 17/12 |
| 2005/0006086 A1* | 1/2005 | Gramme | ............ | B01D 17/0208 |
| | | | | 166/105.5 |
| 2012/0160103 A1* | 6/2012 | Suppiah | ............ | B01D 19/0063 |
| | | | | 95/249 |

FOREIGN PATENT DOCUMENTS

| | | |
|---|---|---|
| WO | 2004016907 A1 | 2/2004 |
| WO | 2006098637 A1 | 9/2006 |
| WO | 2006118468 A1 | 11/2006 |
| WO | 2008115074 A2 | 9/2008 |
| WO | 2014096330 A1 | 6/2014 |

\* cited by examiner

Axial velocity distributions at 1.0 m/s mixture velocity, 25% water cut and pipe inclinations from 0° to +10°.

METHOD AND SYSTEM FOR SEPARATING OIL WELL SUBSTANCES

BACKGROUND

The disclosure is related to a method and a system for separating oil well substances.

More particularly, the disclosure is related to a method and system for separating oil well substances by using an oil and water separator system comprising inclined tubular separators for separating the respective fluid components mixed in fluids from oil wells, combined with providing and maintaining a liquid lock upstream the inclined oil and water tubular separators, as well as establishing and maintaining a water-wetted entrance to the inclined oil and water separators.

Fluids being produced from oil wells may comprise a mixture of fluid and solid components like oil, water, gas and sand, which are commonly referred to as fluid and solid phases, where the percentage fraction of each respective component may vary from one oil field to another, and also during the operational lifetime of the same oil well. It is for example common to have an increase in water content from oil wells towards the end of the production life time of the oil wells.

Separation of fluid components may be necessary to be able to accomplish further processing of the oil and gas in a refinery for example. However, the requirement of further separation is not always a demand. Sometimes there is a demand for very clean oil with a very low water content, while in other cases some water in the produced oil, for instance 1% to 5% may be tolerated.

EP2981341—METHOD FOR SEPARATING SUBSTANCES MIXED IN FLUIDS FROM OIL WELLS and EP2934714—INCLINED TUBULAR SEPARATOR FOR SEPARATING OIL WELL SUBSTANCES, both in the name of the applicant, describe an inclined tubular separator, system and method for providing separation of respective fluid components mixed in fluids from oil wells.

In WO2006118468 it is described a pipe separator for separation of a fluid, in particular separation of fluids with non-mixable fluid components such as oil, gas and water, comprising an extended tubular separator body with a diameter that is principally the same as or slightly larger than the diameter of the inlet pipe and the outlet pipe(s) for the separated components from the separator.

From WO 2006098637 A1 it is known a device in connection with a pipe separator, comprising an extended tubular body with a diameter that is principally the same as or slightly larger than the diameter of the inlet pipe/outlet pipe of the separator. A separate gas manifold is arranged in connection with the inlet. The manifold comprises a number of vertical degassing pipes, which are connected to the inlet pipe immediately ahead of the inlet to the separator and which end in an overlying, preferably slightly inclined gas collection pipe. The gas is designed to be diverted up through the vertical degassing pipes and collected in the gas collection pipe for return to the outlet pipe after the separator or transport onwards to a gas tank or gas processing plant or similar.

In WO2004016907 A1 it is described a pipe separator for the separation of fluids, for example separation of oil, gas and water in connection with the extraction and production of oil and gas from formations beneath the sea bed, comprising a pipe-shaped separator body with an inlet and outlet that principally corresponds to the transport pipe to which the pipe separator is connected. The special feature of this solution is that a pipe bend or loop is arranged in the pipe separator or in connection with its outlet to form a downstream fluid seal in relation to the pipe separator, which is designed to maintain a fluid level in the pipe separator, but which also allows the pipe separator and the loop to be pigged.

An important parameter in systems like this are liquid level interaction between slug suppression and gas removal units and oil and water separators to avoid free gas carry over/under between units.

There is an increased demand of a more efficient separation process, a scalable and adaptable separator system, as well as compact systems with long lifetime.

There is also increasing demands that separation system and associated equipment should be capable of meeting requirements for effective and long transport of fluids by removal of all water avoiding increase in viscosity due to emulsification as well as providing an opportunity to transport the gas as a separate phase.

Hence, a method and system for improved separation of oil well substances would be advantageous, and in particular a more efficient and/or configurable and adaptable method and system would be advantageous.

SUMMARY

The disclosed embodiments provide a method and system for separating oil well substances partly or entirely, while solving the above mentioned drawbacks of prior art and present demands.

Also provided is a method and system for separating oil well substances which provide enhanced separation of oil and gas from water.

The disclosure further provides a method and system for separating oil well substances solving the problem of liquid level interaction between slug suppression and gas removal unit(s) on the one side, and oil and water separators on the other side, to avoid free gas carry over/under between units.

The disclosure further provides a method and system for separating oil well substances avoiding free gas carry over/under between the slug suppression and gas removal unit(s) and the inclined separator system by providing and maintaining a liquid lock upstream the inclined oil and water separator system.

The disclosure further provides a method and system for separating oil well substances which establish and maintain a water-wetted surface in conjunction with inclined oil and water separators.

The disclosure also provides a method and system for separating oil well substances which promote separation of oil and water prior to entering an inclined oil and water separation system.

The disclosure further provides a method and system for separating oil well substances which provides a "boosting" of the separation efficiency of the dispersion band between oil and water.

The disclosure further provides a method and system for separating oil well substances providing a velocity difference between different phases, hence promoting efficient separation by reducing the thickness of the dispersion band present between oil and water.

The disclosure further provides a method and system for separating oil well substances providing a water-wetted inlet to the inclined oil and water separator system even in cases where pure oil with little dispersed water enters the inclined oil and water separation system.

The disclosure is related to a method and system for improvement of the use of inclined tubular separators for separating oil well substances, as described in EP2981341 and EP2934714, both in the name of the applicant, the content of both included herein by reference.

The embodiments disclosed herein accordingly related to an improvement of the use of inclined separator systems including multiple inclined tubular separators comprising:

an elongated outer tube and an elongated inner tube, where the inner tubular tube is arranged inside the outer tube, where oil well substances are introduced into an end of the inner tube via a feed section passing through the outer tube and into the inner tube, and where the inner tube comprises multiple holes or slots arranged in a longitudinal direction, where the inclination of the tubular separator facilitates separation of the oil well substances into lower density substances and higher density substances. In the inclined tubular separators, lower density substances by buoyancy drift upwards through the slots or holes and exit via an upper outlet in the outer tube, and higher density substances sink downwards through the slots or holes and by gravitation exit via a lower outlet in the outer tube.

The disclosed embodiments further take basis in that a slug suppression and gas removal unit (SSGR unit) is arranged between the well and the inclined oil and water separator system.

According to a first aspect of the disclosed embodiments, it is provided and maintained a liquid lock avoiding free gas carry over/under between the SSGR unit and the inclined oil and water separator system. According to a first embodiment this is achieved by that a large diameter horizontal pipeline is arranged upstream of the inclined oil and water separator system, i.e. between the SSGR unit and the inclined oil and water separator system, for transporting fluids to the inclined oil and water separator system. According to a second embodiment this is achieved by arranging a suitable construction for this function, upstream the inclined oil and water separator system, or a downstream unit of the SSGR unit utilizing the elevation difference for slug suppression.

According to a further aspect, separation of oil and water is promoted prior to entering the inclined oil and water separator system by using a horizontal large diameter pipeline between the SSGR unit and the inclined oil and water separator system.

In a further aspect, separation of oil and water is promoted by using horizontal small diameter conditioning pipes upstream the respective inclined tubular oil and water separators, the conditioning pipes extending in longitudinal direction of the respective inclined tubular oil and water separators.

According to a further aspect, a water-wetted entrance to the respective inclined tubular oil and water separator(s) is ensured by using a sloped soft bend extending from the horizontal conditioning pipes to an angle corresponding to the angle of the inner tube and further exhibits a curve with a large radius from the conditioning pipe to the inner tube.

In a further aspect, an interface between oil and water in the inclined tubular oil and water separator is arranged at approximately 50-70% of the overall length (L), referred to inlet end of the inclined tubular oil and water separator.

According to a further aspect, the location of the first hole or slots in the inner tube, referred to the inlet end of the inclined tubular oil and water separator, especially at the water side, is located approximately ⅓ of the overall length (L) of the inclined tubular oil and water separator.

According to a further aspect, the location of the first hole or slots, the number of holes or slots and/or the size of the holes or slots, in the inner tube may be different at the oil side (upper side) compared to the water side (lower side).

In a further aspect, an oil-wetted zone is established in the inclined tubular oil and water separator.

According to a further aspect, a velocity difference is established between oil and water, where the oil velocity is increased and a thinner dispersion band (sedimentation distance) is achieved. The result is an improved coalescence, following a reduced distance for water droplets to form and to grow and finally to move towards the interface between oil and water.

The location of the holes or slots and the location of the interface between oil and water will provide an oil and water separator system where the lower part of the oil and water separator is always maintained water-wetted.

Further, the combination of the location of slots or holes in the inner tube, and control of the oil/water interface, secures a constant presence of water in the sloped soft bend, which will provide improved coalescence, hence better separation of oil and water.

It is further achieved by the sloped soft bend and the presence of a water layer in the sloped soft bend an increasing difference in relative velocity between the fluids. The water will slow down (due to gravity) and oil will increase velocity (due to density difference), hence create larger velocity differences between the two phases, resulting in enhanced break down of the dispersion band between oil and water, accordingly "boosting" the separation of oil and water.

The design of the holes and slots and control of the location of the interphase between oil and water further ensures that the conditioning pipes will be water-wetted even in the cases where pure oil with little dispersed water enters the inclined oil and water separator system.

BRIEF DESCRIPTION OF THE DRAWINGS

The present invention will below be described in further detail with references to the attached drawings, where.

DETAILED DESCRIPTION

Figure 1:
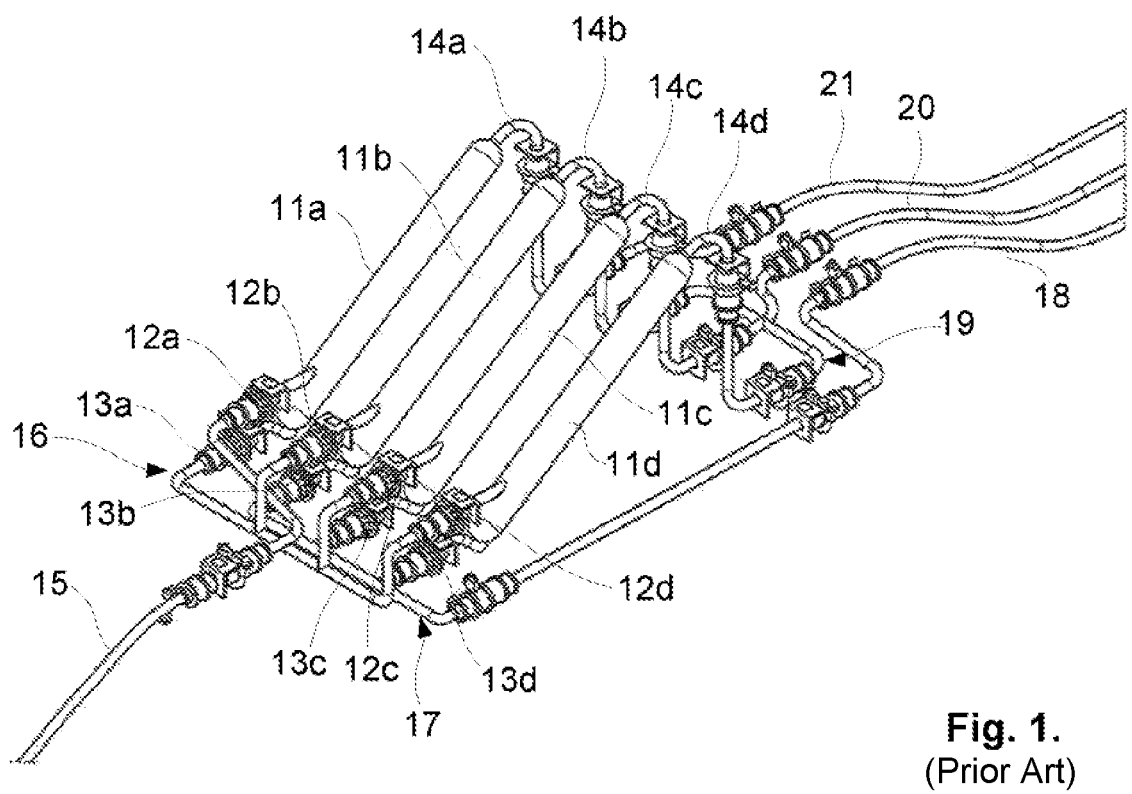
FIG. 1 is a principle drawing of an inclined separator system according to prior art.
Figure 2:
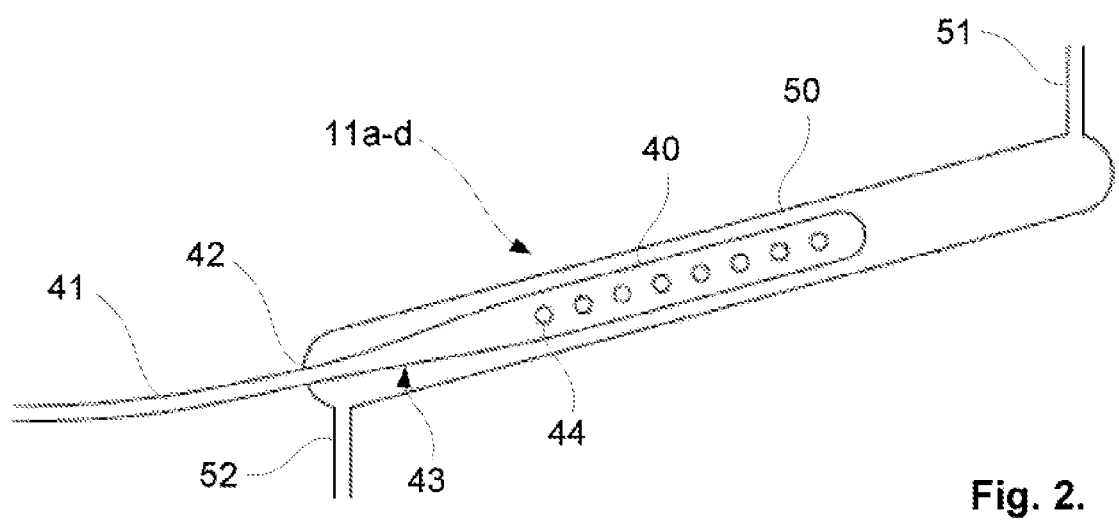
FIG. 2 is principle drawing showing the interior of an inclined tubular separator of the inclined separator system in FIG. 1.

Reference is first made to FIGS. 1 and 2 which are principle drawings of a separator system according to prior art, as described in EP2981341 and EP2934714, illustrated by a separator system comprising four interconnected inclined tubular separators 11a-d using gravity as the separating force.

Each inclined tubular separator 11a-d has a respective inlet 12a-d in a lower section of the inclined tubular separator 11a-d, and a respective outlet 13a-d also located in the lower/bottom section of the inclined tubular separator 11a-d. A respective outlet 14a-d is located in an upper section of the inclined tubular separator 11a-d.

The separator system is supplied with fluid from an oil well (not shown) by a pipe 15 and via an input manifold 16 which distributes the fluid to the respective inclined tubular separators 11a-d and interconnecting the inclined tubular separators 11a-d in a parallel fashion, or in series, or in a combination of parallel and serial configurations. There is further arranged a first output manifold section 17 interconnecting the outlets 13a-d in a parallel fashion, or in series, or in a combination of parallel and serial configurations to an outlet pipe 18.

There is further arranged a second output manifold section 19 interconnecting the outlets 14a-d from the inclined tubular separators 11a-d, in a parallel fashion, or in series, or in a combination of parallel and serial configurations to an outlet pipe 20, with respect to the number of phases the separator system is adapted and manufactured to separate.

In this illustrated example, three of the inclined tubular separators 11b-d are interconnected such that the three outlet openings 14b-d of these in the upper section of the inclined separator system from the three respective tubular separators 11b-d are connected together to a common outlet pipe 20, while one outlet 14a in the upper section from a fourth inclined tubular separator 11a is connected to an outlet pipe 21.

The lower outlet 12b-d of the inclined tubular separators 11b-d are connected together to the outlet pipe 18, while the lower outlet 12a of the inclined tubular separators 11a is connected to the respective inlets 12a-d of the inclined tubular separators 11b-d.

The fluid streaming through the pipe 15 passes a first tubular separator 11a wherein the gas is separated from the fluid because the density of the gas is lower than other fluid phases present in the incoming fluid. The gas phase is transported out through the outlet 14a in the upper section of the inclined tubular separator 14 to the outlet pipe 21.

The outlet 13a of the first inclined tubular separator 14a is connected in parallel to inlets 12b-d of the respective inclined tubular separators 11b-d thereby providing a sufficient separator capacity for separating oil from water and sand, for example. The oil phase is transported out of the separator system via the respective outlets 14b-d of the respective inclined separators 11b-d, and in the output manifold section 19 these outlets are connected together and are connected to the outlet pipe 20 of the separator system. The water and sand phase is transported out of each respective inclined tubular separators 14b-d being configured to separate oil from water and sand via the outlets 13b-d being located in the bottom section of the inclined separator system first outlet manifold 17 and to the outlet pipe 18.

The interconnection pattern provided for with pipe connections in the input manifold section 17, is reflected in the output manifold section 19. The pattern of interconnecting pipes reflects the properties of the incoming fluids from an oil well, while the interconnection pattern in the output manifold section 19 reflects how many fluid phases that are to be separated and how different fluid phases will still be combined. Therefore, there is a functional relationship between the interconnecting pattern of pipes in the input manifold section 17 and the output manifold section 19, but not necessary as a one to one mapping of the configuration of the respective pipes in each respective manifold section.

Reference is now made to FIG. 2, showing details of the interior of the inclined tubular separators 11a-d. The inclined tubular separators 11a-d have an inner elongated tube 40 located centred inside an outer elongated tube 50, wherein the inner tube 40 is in fluid communication with the input manifold 17 or pipe 15 via the respective inlets 12a-d and via a curved pipe 41 extending out of the outer tube 50 via an opening 42 in a side wall of the outer tube 50 at a lower section of the inclined tubular separator 11a-d. The inner tube 40 exhibits a conical shaped part 43 at the lower/inlet part thereof expanding in width from the curved pipe 41 to a final width of the inner tube 40. The walls of the inner tube 40 are further perforated with a plurality of holes or slots 44, and the inner tube 40 is terminated and closed at upper end thereof. The outer tube 50 has a first outlet opening 51 arranged at upper end thereof connected to the outlet 14a-d and a second outlet opening 52 at lower end thereof connected to the outlet 13a-d. The curved pipe 41 provides a small cyclone effect separating oil and water in two layers before the mixed fluid enters the conical shaped part 43. The conical shape will reduce the speed of the fluid before passing the inner tube holes or slots 44.

The disclosed embodiments improve the above described inclined oil and water separator system by establishing and maintaining a water-wetted inlet pipe surface in conjunction with a slug suppression and gas removal unit 100 (SSGR), horizontal large diameter pipeline 300 and multiple inclined tubular oil and water separators 11a-d, based on the principles described above.

Figure 3:
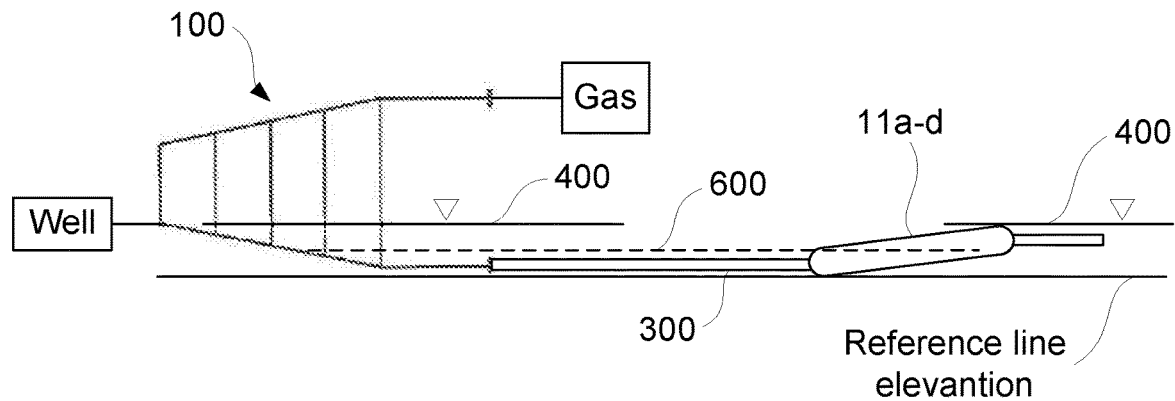
FIG. 3 is a principle drawing of an embodiment of the disclosed inclined oil and water separator system.

Reference is now made to FIG. 3 which is a principle drawing of the disclosed system, illustrating the principle of establishing and maintaining a water-wetted surface.

In an inclined oil and water separator system like this, a unit 100 designed to suppress slug flow and remove free gas (SSGR unit), will preferably be arranged between the well and the inclined oil and water separator system. The inclined oil and water separator system will further be connected to the SSGR unit 100 via a large diameter pipeline 300 extending mainly horizontally from the SSGR unit 100 to the inclined oil and water separator system.

An important parameter when combined with an inclined oil and water separator system is the liquid level 400 interaction between the SSGR unit 100 and the inclined tubular oil and water separators 11a-d of the inclined oil and water separator system. This liquid level 400 shall be of close to equal height providing a liquid lock avoiding free gas carry over/under between the units. Associated gas (dispersed in the liquids) will be transported in the large diameter pipeline 300, but further gas release will be minimal and not interfere with the operation or function of the inclined oil and water separator system.

This liquid lock can also be arranged in other ways, such as e.g. by using a gas harp, as well known in prior art, e.g. WO 2006/098637, upstream the inclined oil and water separators 11a-d, where the gas harp will function as a Slug Suppressor Gas Removal (SSGR) unit 100.

Downstream the SSGR unit 100 the fluids will be transported in a large diameter pipeline 300 entering the inclined oil and water separators 11a-d of the inclined oil and water separator system. The liquid level (elevation) 400 of the SSGR unit 100 located at a slope part of the gas Harp/SSGR unit 100 and at the top of inclined oil and water separators 11a-d will provide and maintain the liquid lock upstream the inclined tubular oil and water separators 11a-d preventing gas carry over/under.

As mentioned, the inclined oil and water separator system will consist of multiple inclined tubular oil and water separators 11*a-d*, as described above with modifications which will be further described below, the number of inclined tubular oil and water separators 11*a-d* will depend on the flow rate and separability of oil/water.

Figure 4A:
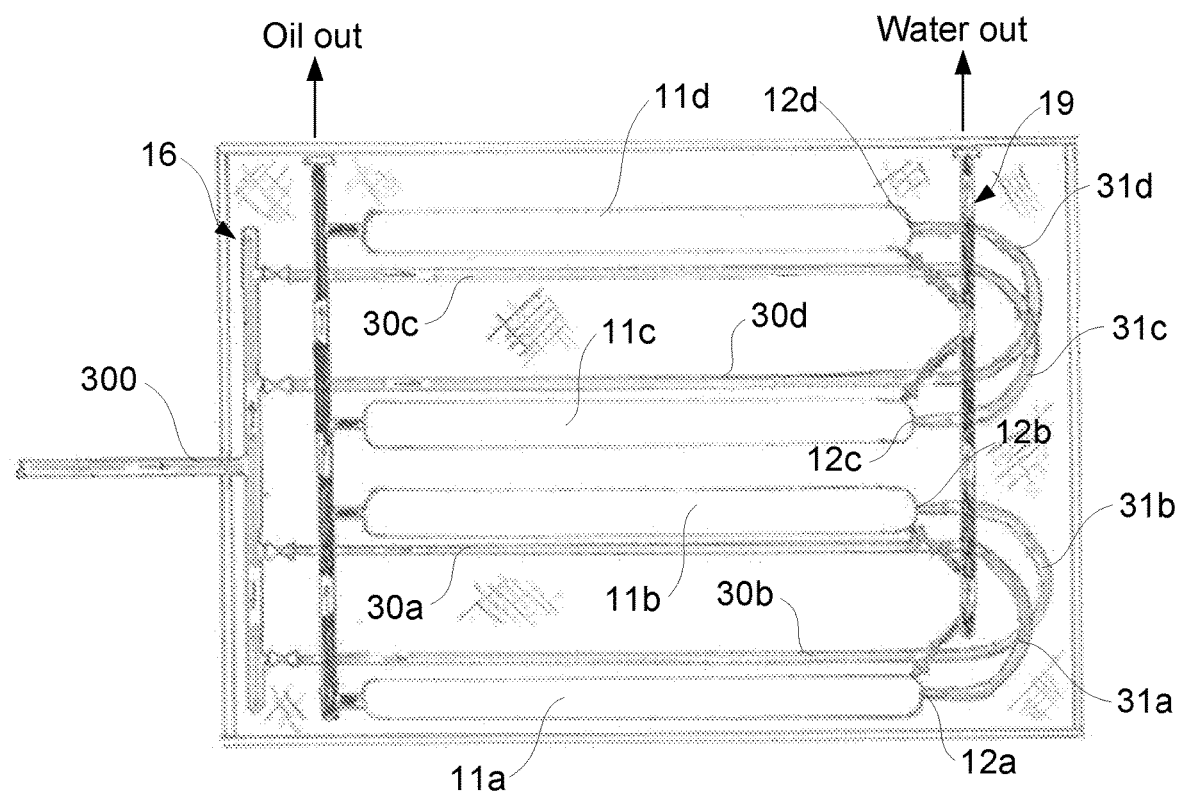
FIG. 4a-b are principle drawings of an embodiment of the disclosed inclined tubular oil and water separator.
Figure 4B:
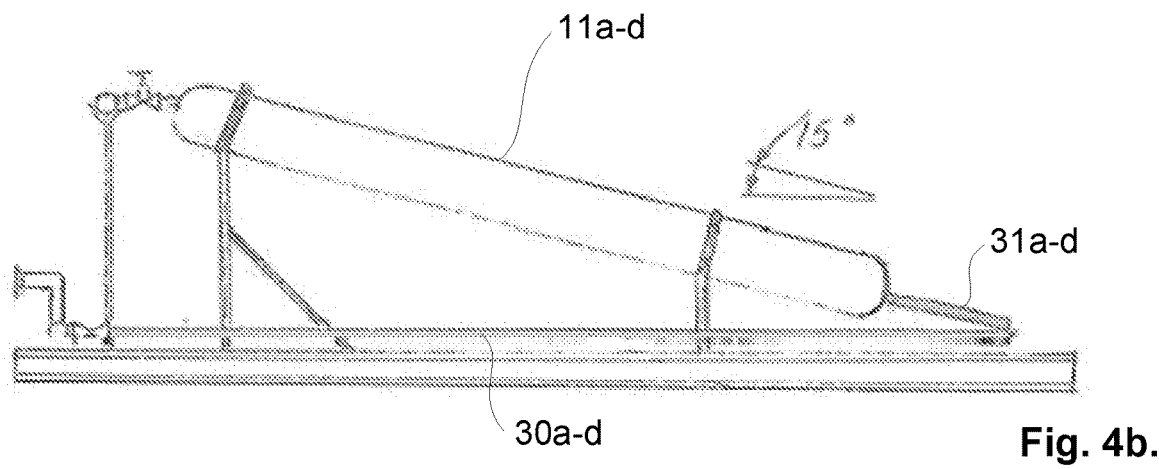

Reference is now made to FIGS. 4*a-b*. In addition to the horizontal lager diameter pipeline 300 upstream the inclined oil and water separator system, the disclosed system includes use of multiple small diameter conditioning pipes 30*a-d* downstream the inlet manifold 16, i.e. upstream the respective inlets 12*a-d* of the inclined tubular oil and water separators 11*a-d*. In the example there is shown a parallel configuration, but also series configuration or a combination of series and parallel configuration can be used, as described above.

Accordingly, the horizontal larger diameter pipeline 300 supplies fluids from the well to the manifold 16 distributing the fluids into the multiple small diameter conditioning pipes 30*a-d* downstream the inlet manifold 16.

The terms "large diameter" (D1) for the horizontal pipeline 300 and "small diameter" (D2) for the conditioning pipes 30 are related to each other and are to be interpreted that the pipeline 300 has considerably larger diameter than the diameter of the conditioning pipes 30*a-d*. E.g. the horizontal pipeline 300 can have a diameter between 10" and 20", while the conditioning pipes 30*a-d* can have a diameter between 2" and 10", more preferably between 4" and 8".

Accordingly, the respective conditioning pipes 30*a-d* preferably extend horizontally from the inlet manifold 16, in longitudinal direction of the respective inclined tubular oil and water separator 11*a-d*, and is connected to the respective inlet 12*a-d* via respective sloped soft bends 31*a-d*, the sloped soft bends 31*a-d* exhibiting a curve of 180 degrees before they are connected to the respective inlet 12*a-d*, as well as an angle from horizontal to an angle corresponding with the angle of the inner tube 40. The sloped soft bends 31*a-d* correspond to the above mentioned curved pipes 41, and connects the conditioning pipes 30*a-d* to inner tube 40 of the respective inclined tubular oil and water separator 11*a-d*.

The conditioning pipes 30*a-d* between the inlet manifold 16 and the respective inclined tubular separator 11*a-d* shall be of length minimum 20×D2, and normally not longer than 80×D2. The function of the conditioning pipes 30*a-d* is to promote separation of oil and water prior to entering the inclined tubular oil and water separators 11*a-d*.

Figure 5:
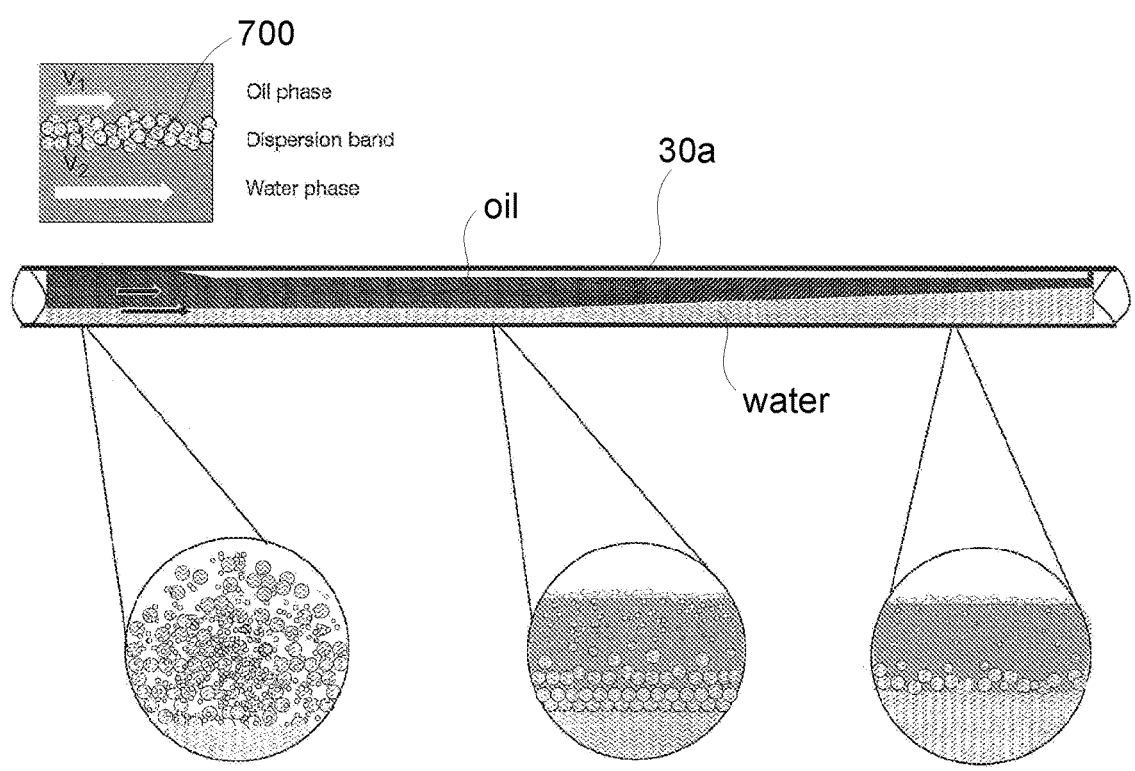
FIG. 5 is a principle drawing of the described effects in a horizontal (conditioning) pipe.

In FIG. 5 this is shown schematically by a longitudinal cross-sectional view of a conditioning pipe 30*a*, with exploded views showing details. Along the extension of the conditioning pipe 30*a*, as well as along the extension of the large diameter pipeline 300, separation between water and oil occurs due to gravity forces. Along the extension of the conditioning pipe 30*a-d*/large diameter pipe 300 this will result in increased oil velocity and dispersion band 700 which make the sedimentation distance for water droplets in oil to move towards the interface between oil and water shorter. This increase of velocity difference between oil and water will enhance separation by breaking the dispersion band 700.

Figure 6:
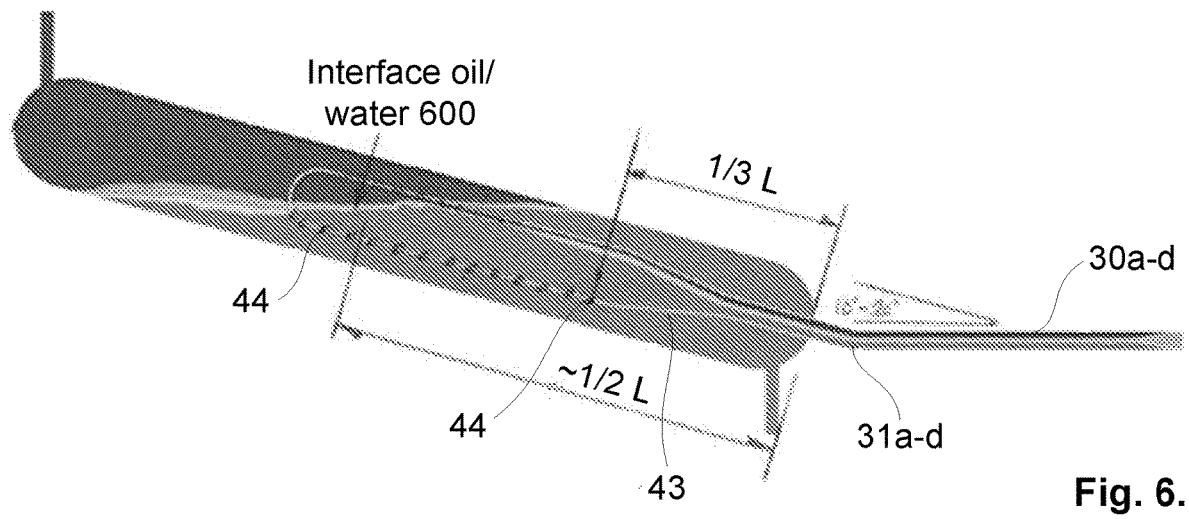
FIGS. 6 and 7 are principle drawings of an inclined tubular oil and water separator showing details of holes or slots, and oil and water interface.

Reference is now made to FIG. 6 showing a detailed view of the interior of the inclined tubular oil and water separators 11*a-d*. The sloped soft bends 31*a-d* extending from horizontal to an angle of between 10° to 20° representing the inlet section of the inclined tubular oil and water separators 11*a-d* are designed with a large radius, the large radius being at least 1 meter, preferably between 1 and 4 meters, accordingly radius»1,64 $R_{sloped\ soft\ bend}$, hence not interfering with the established layered flow pattern created in the conditioning pipes 30*a-d*. In the prior art solution of FIGS. 1-2 the curved pipe 41 only have a curvature in the vertical plane, while the sloped soft bends 31*a-d* will have a curvature in both vertical and horizontal direction/plane.

As for the prior art solution, also the inclined tubular oil and water separators 11*a-d* according to the disclosure includes an inner tube 40 which includes a conical part 43 at lower part thereof, i.e. facing the sloped soft bend 31*a-d* and forms an expanding inlet. The angle of the conical part 43 (expanding part) is preferably between 5° and 15°, more preferably between 7° and 10°, with reference to the center line of the inner tube 40.

Figure 7:
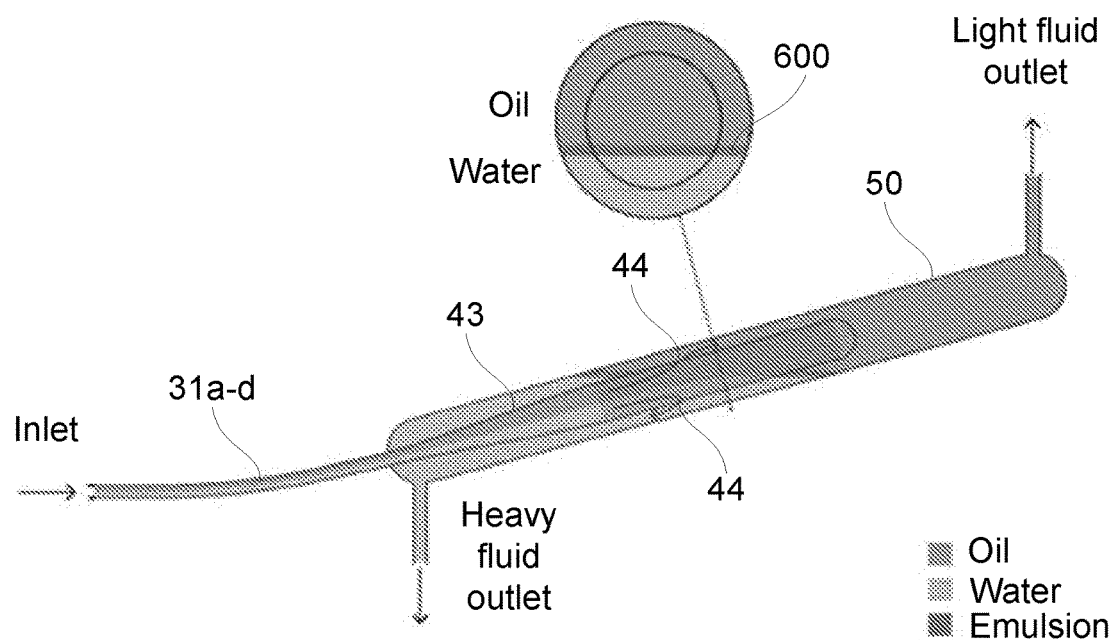

The inner tube 40 further also includes perforations in the form of holes or slots 44. The location of the holes or slots 44 and the interface 600 between oil and water in the inclined tubular separator 11*a-d*, provide an oil and water separator system that establish and maintain the sloped soft bends 31*a-d*, the conditioning pipes 30*a-d*, that always will have a lower part that is water-wetted, as shown in FIG. 7.

Further, the location of the first hole or slot 44, referred to inlet end of the inclined tubular oil and water separator 11*a-d*, at least at the water side, start approx. ⅓ of the overall length L of the inclined tubular oil and water separator 11*a-d*, i.e. after the conical part 43.

It should be mentioned that the number and size of holes or slots 44 at the oil and water side, respectively, can be different. Also the location of the first hole or slot 44 on the oil side (upper side) can be further from the inlet end of the inclined tubular oil and water separator 11*a-d* than the first hole or slot 11*a-d* at the water side (the lower side).

The interface 600 between oil and water is located at approx. 50-70% of the overall length L of the inclined tubular oil and water separator 11*a-d*, referred to inlet end of the inclined tubular oil and water separator 11*a-d*. This combination, location of holes or slots 44, and oil/water interface 600, secures a constant presence of water in the sloped soft bend 31*a-d*. Achieved by this is improved coalescence, hence better separation of oil and water.

Figure 8:
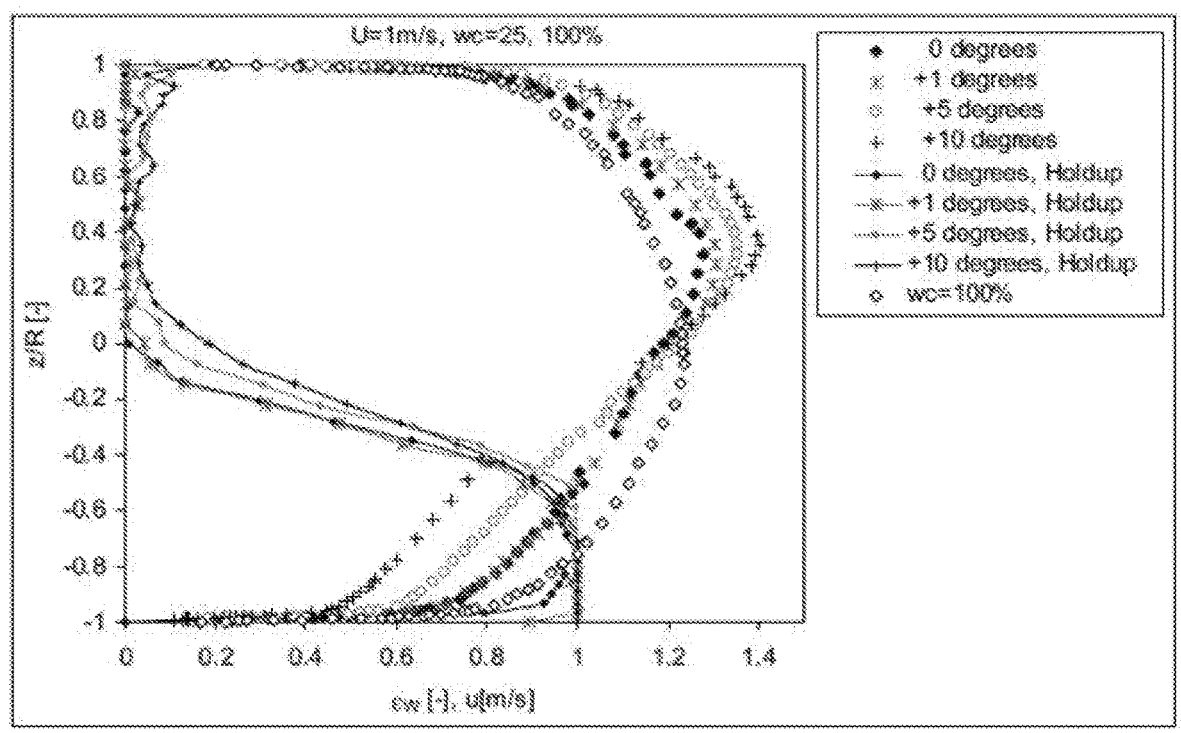
FIG. 8 is a simulation result showing the effects of inclination at inlet end of the inclined tubular oil and water separator.

Another phenomenon due to the upward sloped soft bends 31*a-d* and the presence of a water layer in the sloped soft bends 31*a-d*, is an increasing difference in relative velocity between the fluids (oil and water). The water will slow down (due to gravity) and oil will increase velocity (due to density difference), hence creating larger velocity differences between the two phases (oil and water), as shown in FIG. 8. As seen from FIG. 8 and the +10 degrees (+) mark up the velocity difference between oil and water is close to 1 m/s due to the angle from the horizontal. This effect will assist in "boosting" the separation of the dispersion band between oil and water.

The conical shaped part 43 (expanding inlet of the inner tube 40) will provide a common effect with more area, increased oil velocity and thinner dispersion band 700 which make the sedimentation distance shorter for water droplets in oil to move towards the interface 600 between oil and water, as shown in FIG. 3. The velocity of the oil will increase along the expanding inner tube 40, hence water will reduce the velocity setting up a difference in velocity $v_{oil} \gg v_{water}$, as shown in FIG. 8. This increasing of velocity difference will enhance separation by breaking the dispersion band 700.

Further, the conical shaped part 43 upper part will establish an oil continuous layer, which at higher water cuts will increase the separation of oil from water, which results in an increase in rate of oil droplet coalescence.

The design where the inner tube 40 has a slot or hole 44 located at a position ⅓ L, at least at the water side, from inlet of the inclined tubular oil and water separator 11*a-d*, and an interphase between oil and water at 50-70% of the overall length L from inlet of the inclined tubular oil and water separator 11*a-d*, ensures that the conditioning pipes 30*a-d* will be water-wetted even in the cases where pure oil with little dispersed water enters the separator system. This water lock function will always create the velocity difference between the phases (oil and water); hence promote separation by reducing the dispersion band 700 normally present between oil and water.

Intermittent flow, creating pockets of nearly pure oil with little water, and then pockets of water with low content of oil, may frequently be experienced in long, horizontal wells or long horizontal pipelines for seafloor transportation.

Accordingly, by the disclosed embodiments is provided an inlet arrangement for an oil and water separator system designed to establish and maintain a water-wetted inlet pipe surface in conjunction with a slug suppression and gas removal unit (SSGR), horizontal interconnecting pipes and multiple inclined tubular oil and water separators.

The invention claimed is:

1. A method for separating oil well substances with a system that includes a slug suppression and gas removal unit (100) suitable to be arranged to a well, the slug suppression and gas removal unit (100) configured to suppress slug flow and remove free gas, and an inclined separator system connected to a fluid outlet of the slug suppression and gas removal unit (100) by a horizontal large diameter pipeline (300), wherein the inclined separator system comprises a plurality of inclined tubular oil and water separators (11*a-d*), each of the plurality of inclined tubular oil and water separators being formed by a longitudinally extending elongated inner tube (40) positioned within a longitudinally extending elongated outer tube (50), each inner tube (40) of the plurality of tubular oil and water separators (11*a-d*) having a plurality of holes or slots (44) arranged longitudinally therein and being inclined at an angle, and wherein oil well substances are introduced into one end of the inner tube (40) via a feed section passing through the outer tube (50) and into the inner tube (40), comprising the steps of:

arranging a liquid level (400) interaction between a slope part of the slug suppression removal unit (100) and at a top of the at least one respective inclined tubular oil and water separator (11*a-d*) to be substantially equal height to provide and maintain a liquid lock for avoiding free gas carry-over or carry-under between the slug suppression removal unit (100) and the inclined tubular oil and water separators (11*a-d*), and establishing and maintaining a water-wetted entrance to the respective inclined tubular separator (11*a-d*) with a sloped soft bend (31*a-d*) at an inlet (12*a-d*) of the respective inclined tubular oil and water separator (11*a-d*), the sloped soft bend (31*a-d*) having a curvature in a vertical and a horizontal direction and an angle corresponding to the angle of inclination of the inner tube (40), and arranging an interface between oil and water (600) in the respective inclined tubular oil and water separator (11*a-d*) at a position approximately 50-70% of a length L of the respective inclined tubular oil and water separator (11*a-d*) measured from the inlet end of the respective inclined tubular oil and water separator (11*a-d*), wherein the first of the longitudinally arranged plurality of holes or slots (44) in the inner tube (40) of the respective tubular oil and water separator (11*a-d*), at least at a water side of the interface, is positioned at least approximately ⅓ of the length L of the inclined tubular oil and water separator (11*a-d*) measured from the inlet end.

2. The method according to claim 1, comprising arranging the liquid level (400) at the top of the inclined tubular oil and water separators (11*a-d*).

3. The method according to claim 1, comprising promoting separation of oil and water prior to entering the inclined tubular separators (11*a-d*) by using the horizontal large diameter pipeline (300) between the slug suppression and gas removal unit (100) and the inclined separator system.

4. The method according to claim 1, comprising promoting separation of oil and water by using horizontal small diameter conditioning pipes (30*a-d*) upstream of the respective inclined tubular separators (11*a-d*), the conditioning pipes (30*a-d*) extending in a longitudinal direction of the respective inclined tubular separators (11*a-d*).

5. The method according to claim 1, comprising creating a velocity difference between oil and water by providing a conical expanding inlet (43) at the inner tube (40).

6. The method of claim 5, wherein the angle of the conical expanding inlet (43) is within a range of 5° and 15° with reference to the center line of the inner tube (40).

7. A system for separating oil well substances, the system including a slug suppression and gas removal unit (100) suitable to be arranged to a well, the slug suppression and gas removal unit (100) configured to suppress slug flow and remove free gas, and an inclined oil and water separator system connected to a fluid outlet of the slug suppression and gas removal unit (100) by a horizontal large diameter pipeline (300), wherein the inclined separator system comprises a plurality of inclined tubular oil and water separators (11*a-d*), each of the plurality of inclined tubular oil and water separators (11*a-d*) being formed by a longitudinally extending elongated inner tube (40) positioned within a longitudinally extending elongated outer tube (50), each inner tube (40) of the plurality of tubular oil and water separators (11*a-d*) having a plurality of holes or slots (44) arranged longitudinally therein and being inclined at an angle, oil well substances being introduced into one end of the inner tube (40) via a feed section passing through the outer tube (50) and into the inner tube (40), the slug suppression and gas removal unit (100) being connected to the inclined separator system via the horizontal pipeline (300), wherein the slug suppression and gas removal unit (100) and at least one respective inclined tubular oil and water separator (11*a-d*) are arranged such that a liquid level (400) interaction between the liquid level (400) at a slope part of the slug suppression and gas removal unit (100) and at a top of the inclined tubular oil and water separators (11*a-d*) is substantially equal height, thereby providing a liquid lock that avoids free gas carry-over or carry-under between the slug suppression removal unit (100) and the inclined tubular oil and water separators (11*a-d*), and the system is arranged to provide a water-wetted entrance to the respective inclined tubular separator (11*a-d*) via sloped soft bends (31*a-d*) at an inlet (12*a-d*) of the respective inclined tubular oil and water separator (11*a-d*), the sloped soft bends (31*a-d*) having a curvature in a vertical and a horizontal direction and an angle corresponding to the angle of inclination of the inner tube (40) and an interface (600) between oil and water in the respective inclined tubular oil and water separator (11*a-d*) being at a position approximately 50-70% of a length L of the respective inclined tubular oil and water separator (11*a-d*) measured from the inlet end of the respective inclined tubular oil and water separator (11*a-d*), wherein the first of the longitudinally arranged plurality of holes or slots (44) in the inner tube (40) of the respective tubular oil and water separator (11*a-d*), at least at a water side of the interface, is positioned at least approximately ⅓ of the length L of the inclined tubular oil and water separator (11*a-d*) measured from the inlet end.

8. The system according to claim 7, wherein the feed section includes an inlet manifold (16) connected to the horizontal pipeline (300) at one end and to respective small diameter conditioning pipes (30*a-d*) at the opposite end, and the small diameter conditioning pipes (30*a-d*) extend horizontally in the longitudinal direction of the respective inclined tubular oil and water separator (11*a-d*).

9. The system according to claim 8, wherein the respective conditioning pipes (30*a-d*) are arranged to the respective sloped soft bends (31*a-d*) connecting the conditioning pipes (30*a-d*) to the inner tube (40) of the respective inclined tubular oil and water separator (11*a-d*).

10. The system according to claim 9, wherein the sloped soft bends (31*a-d*) extend from horizontal to an angle corresponding to the angle of the inner tube (40) and further exhibit a curve with a radius from the conditioning pipe (30*a-d*) to the inner tube (40) of at least 1 meter.

11. The system according to claim 10, wherein the angle is between 10° and 20°.

12. The system according to claim 10, wherein the radius is within the range of 1-4 meters.

* * * * *